(12) United States Patent
Lysenkov

(10) Patent No.: US 10,891,789 B2
(45) Date of Patent: Jan. 12, 2021

(54) METHOD TO PRODUCE 3D MODEL FROM ONE OR SEVERAL IMAGES

(71) Applicant: Ilya Lysenkov, Nizhny Novgorod (RU)

(72) Inventor: Ilya Lysenkov, Nizhny Novgorod (RU)

(73) Assignee: ITSEEZ3D, INC., Santa Clara, CA (US)

( * ) Notice: Subject to any disclaimer, the term of this patent is extended or adjusted under 35 U.S.C. 154(b) by 0 days.

(21) Appl. No.: 16/426,127

(22) Filed: May 30, 2019

(65) Prior Publication Data
US 2020/0380780 A1 Dec. 3, 2020

(51) Int. Cl.
*G06T 17/20* (2006.01)
*G06T 3/00* (2006.01)
*G06N 3/08* (2006.01)
*G06K 9/00* (2006.01)

(52) U.S. Cl.
CPC ........ *G06T 17/205* (2013.01); *G06K 9/00208* (2013.01); *G06K 9/00268* (2013.01); *G06N 3/08* (2013.01); *G06T 3/0006* (2013.01)

(58) Field of Classification Search
CPC . G06T 17/205; G06T 3/0006; G06K 9/00208; G06K 9/00268; G06N 3/08
See application file for complete search history.

(56) References Cited

U.S. PATENT DOCUMENTS

2010/0202699 A1* 8/2010 Matsuzaka ............ G06T 11/001
382/195
2013/0201187 A1* 8/2013 Tong .................... G06K 9/6255
345/420

OTHER PUBLICATIONS

Feng, Yao, et al. "Joint 3d face reconstruction and dense alignment with position map regression network." Proceedings of the European Conference on Computer Vision (ECCV). 2018. (Year: 2018).*
Blanz, Volker, and Thomas Vetter. "A morphable model for the synthesis of 3D faces." Proceedings of the 26th annual conference on Computer graphics and interactive techniques. 1999. (Year: 1999).*

* cited by examiner

*Primary Examiner* — Daniel F Hajnik
(74) *Attorney, Agent, or Firm* — Enshan Hong; VLP Law Group LLP

(57) ABSTRACT

The present invention provides a method to produce a 3D model of a person or an object from just one or several image. The method uses a neural network that is trained on pairs of 3D models of human heads and their frontal images, and then, given an image, infers a 3D model.

4 Claims, 4 Drawing Sheets

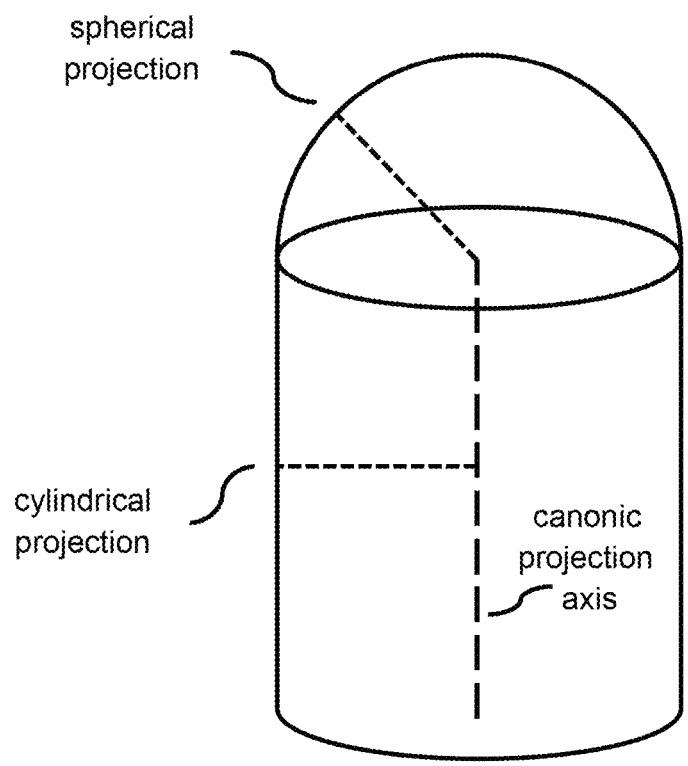
Figure 1. Cylinder with half-sphere projection

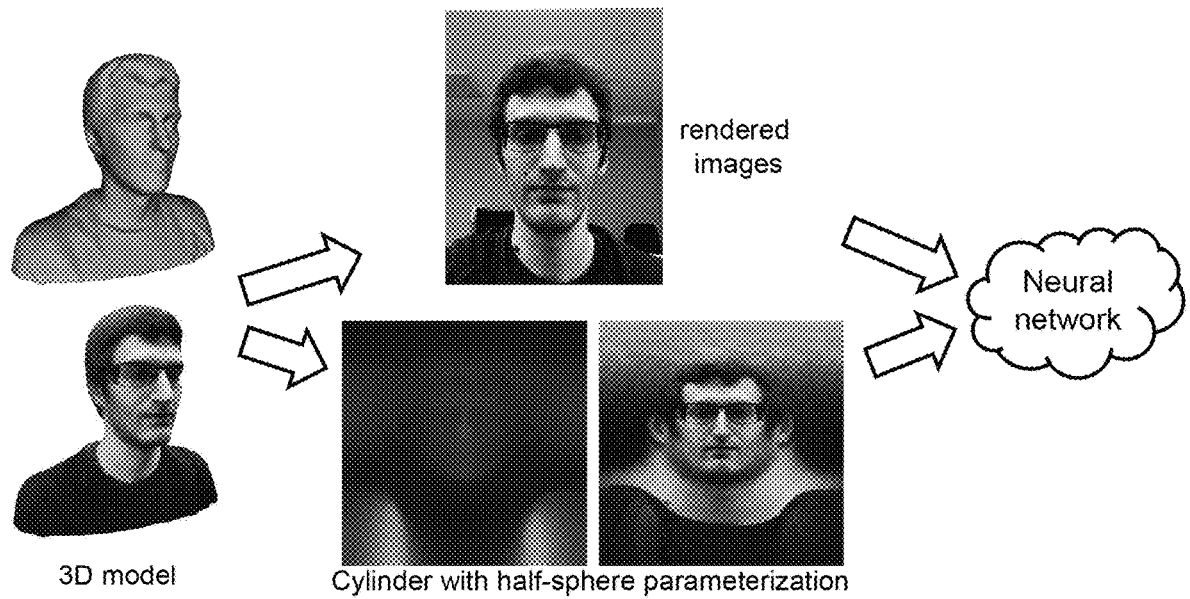

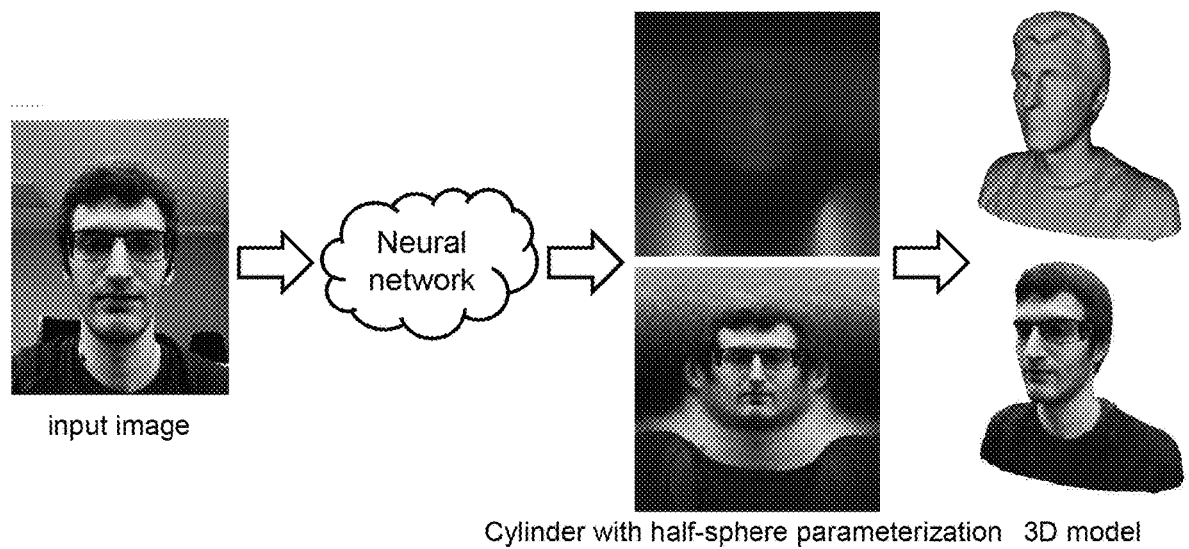
Figure 3. Testing

Figure 4. Alignment
$I_s$
$I_t$
input selfie

METHOD TO PRODUCE 3D MODEL FROM ONE OR SEVERAL IMAGES

BACKGROUND OF THE INVENTION

Field of Invention

The present invention relates to a method to produce a 3D model of a person or an object from just one or several images. It includes a new class of shape and texture parameterizations of a 3D model of a human face, suitable for use with deep neural networks.

The idea behind generating a 3D model from one image is to use a corpus of 3D models of people to learn the relationship between a 3D model (shape and texture) and a frontal image of that model. The learning comes in a form of training a neural network. Then we can use this neural network to solve an inverse problem: given a frontal image, reconstruct a 3D model. This invention addresses one of the biggest challenges of this task: how to represent a 3D model for neural network learning.

Description of the Related Art

The problem of 3D face reconstruction is commonly solved using Morphable Model framework [1] and this framework was also used with deep neural networks [2, 3]. However, it is not applicable when the reconstruction of full head with shoulders is required as in our case (due to too drastic variances in appearances and geometry of full human bust). Also the morphable model framework is limited in its representational power, e.g. it can describe fine details in geometry and texture with only adhoc techniques. Our approach doesn't have these limitations and provides end-to-end solution for 3D model reconstruction from a single image. It is also applicable not only to 3D models of humanoids but to a wide variety of objects such as full body models, furniture, buildings and cars exterior, kitchenware, home appliances etc.

The common method for generating training data is to use diverse collections of images, fit morphable model into these images and then use the fitted parameters as ground truth (e.g. [3]), or use morphable model to generate artificial heads (e.g. [4]). We propose to use a diverse collection of 3D scans instead and render them to produce input image data. While it is non-obvious whether this approach can give satisfactory results due to artifacts in scans and use of fully artificial data for training, our experiments show that it works quite well, and the neural network trained with such data generalizes well to the real input images taken by users.

Neural networks are commonly used for so called "image-to-image" translation, with [8] as a notable example. In order to use neural networks for generating 3D models, we need to come up with a way to represent a 3D model as an image (further referred to as "parameterization"). There is a vast field of research in computer graphics community on how to parameterize a 3D model (see [5] for a review). However, these methods are aimed to represent texture in 2D domain with minimal distortions, while shape is represented as a 3D mesh (as defined below). This shape representation is poorly suited for neural networks. For example, such a shape representation was used in papers [14, 15] and only low-resolution results were produced.

Parameterizations that address specifically the problem of 3D face reconstruction were proposed in [6, 7]. However, again there is no alignment between target texture and target shape, which leads to poor results for neural network training and inference. The parameterization we propose below produces a better alignment between texture and shape images, but it is still not perfect. In this case standard architectures for neural networks will produce poor results and that is why our modifications of including either dilated [9] or deformable [10] convolutions are crucial.

SUMMARY OF THE INVENTION

The present invention addresses the problem of 3D face reconstruction from an image(s). This is an important problem, because its solution enables much more affordable and instant 3D data generation than what is available now. Such a solution can be applied in video communication, virtual try-on solutions for clothes and glasses, video games and mobile entertainment apps, 3D printing and more. Although in the rest of the present application we will be talking about face reconstruction, the same algorithms can be applied to reconstructing other types of objects, such as full body models, furniture and buildings.

The present invention provides a system that allows the generation of a 3D model from one or several images. The system consists of a neural network that is trained on pairs of 3D models of human heads and their frontal images, and then, given an image, infers a 3D model. In order to implement this system it is necessary to represent a 3D model with one or several images that will be an input for a neural network during training, and an output during inference. The creation of such a mapping is one of the most challenging aspects of this problem. So, we start by describing the mapping between a 3D model and images.

One embodiment of the present invention is a method of neural network learning of 3D models of human heads comprising the steps of:
a) providing at least two training 3D models produced by scanning or modeling representative human heads;
b) mapping each training 3D model to a pair of target images comprising an $I_s$ image that describes the model shape, and an $I_t$ image that describes the model texture; and
c) rendering a frontal image of each training 3D model, detecting facial features in the frontal images, and applying a 2D affine transformation to the frontal images in order to make the coordinates of the facial features as close to the average position of facial features for all the training 3D models to produce frontal images of the representative heads.

A second embodiment of the present invention is a method of producing a 3D model from a 2D image of an individual human head comprising the steps of:
d) providing a 2D input image containing an individual human head in a frontal position; detecting facial features in the 2D input image, and applying a 2D affine transformation to the image in order to make the coordinates of the facial features as close to the average position of facial features for all the training 3D models stored in a neural network to produce a final 2D input image;
e) using the neural network to generate a pair of target images $I_s$ and $I_t$ of the individual human head from the 2D input image; and
f) reconstructing a 3D model of the individual human head from the pair of target images $I_s$ and $I_t$ generated by the neural network.

The method of neural network learning of 3D models of human heads may have a step b) that comprises
i) placing each of the training 3D model of a human head in the standard orientation into a reference surface, wherein the reference surface consists of a cylinder and a half-sphere, the cylinder axis coinciding with the z axis, the cylinder upper plane being placed on the level of a forehead of training 3D model, and the half-sphere placed on top of the cylinder upper plane; and the standard orientation is the training 3D model orientation with a line between the eyes parallel to x axis, the line of sight parallel to y axis, and z axis going from the (approximately) center of the neck up to the top of the head;

ii) for points with z coordinate smaller than or equal to the upper cylinder plane, producing a cylindrical projection to establish the correspondence between the human head and the reference surface;

iii) for points with z coordinate larger than the cylinder upper plane, producing a spherical projection to establish the correspondence between the human head and the reference surface; and iv) defining a distance r for each point from the human head as a distance from a point from the human head to the cylinder axis for points lower than or equal to the cylinder upper plane, and as a distance from a point from the human head to the half-sphere center for points above the cylinder upper plane.

The above step b) may further comprise:

v) mapping the lower part of the images $I_s$ and $I_t$ to the cylinder, with x coordinates of image pixels linearly mapped to the azimuthal angle of the cylinder points, and y coordinates of image pixels linearly mapped to the z coordinate of the cylinder points;

vi) mapping the upper part of the images $I_s$ and $I_t$ to the half-sphere, with x coordinate of image pixels linearly mapped to the azimuthal angle of the half-sphere points, and y coordinate of image pixels linearly mapped to the polar angle of the half-sphere points.

The method of producing a 3D model from a 2D image of an individual human head may have a step f) of reconstructing a 3D model of a human head from a pair of target images $I_s$ and $I_t$ that comprises:

mapping the pair of target images $I_s$ and $I_t$ onto a reference surface, wherein the reference surface consists of a cylinder and a half-sphere, to produce a plurality of reference surface points;

reconstructing the 3D model of a human head from the plurality of reference surface points.

The method of producing a 3D model from a 2D image of an individual human head may be further processed by the step of smoothing, sharpening, simplifying or re-meshing.

BRIEF DESCRIPTION OF THE DRAWINGS

In the drawings:

FIG. 1 shows a cylinder with a half-sphere projection

FIG. 2 shows the generation of a set of frontal images for each 3D model, having varying lighting and pose. This set of 3D model images and frontal images is then used to train the neural network.

FIG. 3 shows an overview of the testing procedure, whereby we use an input image to generate $I_s$ and $I_t$ using a neural network, and then reconstructing a 3D model from $I_s$ and $I_t$.

FIG. 4 shows the mapping of a 3D model to images $I_s$ and $I_t$ ensures alignment between these images, but the input image with a person's selfie is not aligned with either $I_s$ or $I_t$.

DETAILED DESCRIPTION OF THE PRESENTLY PREFERRED EMBODIMENTS 1. 3D Model Parameterization We want to represent a 3D model with 2D images that can be both the input and output of a neural network. A 3D model is represented by shape and texture. Shape in this context is defined by a 3D mesh, which is a set V of vertices, each defined by 3 coordinates (x,y,z), and a set P of polygons (for example, triangles) that have vertices from the set V. We assume the 3D mesh representing a human head is oriented normally, with a line between the eyes parallel to x axis, the line of sight parallel to y axis, and z axis going from the (approximately) center of the neck up to the top of the head. We will call this "standard orientation". The key element of our representation is a mapping between the 3D mesh and the reference surface that consists of a cylinder and a half-sphere covering the cylinder (see FIG. 1). We position the cylinder axis along z axis, and the top of the cylinder is on the level of forehead. The model points with smaller z coordinates than the top plane of the cylinder are projected to the cylinder surface using the cylindrical projection: a point A on the 3D mesh (that is, point A belonging to one of 3D mesh polygons) is connected by a straight line parallel to x-y plane to the cylinder axis, and the projection point B is the intersection point between this line and cylinder surface (see FIG. 1). The 3D mesh points with z coordinates larger than the cylinder top plane are projected onto the half-sphere using the spherical projection: a point A' on the 3D mesh surface is connected by a straight line to the sphere center, and the projection point B' is the intersection of the line with the half-sphere surface.

The cylinder surface is represented by cylindrical coordinates, so each point on the surface can be represented as $(r,\varphi,z)$, where r is a distance from a point to the cylinder axis, and $\varphi$ is the azimuthal angle. Points on the half-sphere are represented by spherical coordinates $(R,\varphi,\theta)$, with the center in the sphere center. Here R is the distance from a point to the sphere center, $\varphi$ and $\theta$ are the azimuthal and polar angles correspondingly. $\theta=0$ corresponds to the top point of the half-sphere, $\theta=\pi/2$ corresponds to the top plane of the cylinder.

Now we can define the mapping from a 3D model to two images $I_s$ and $I_t$, where $I_s$ describes model shape, and $I_t$ describes model texture. A pixel in an image is represented by its coordinates (x,y). Both images have the same resolution, so that $0 \leq x < x_{max}$, $0 \leq y < y_{max}$, where y axis is directed from image top to bottom, so that the scanline y=0 is the topmost line. We divide each image in two parts with the horizontal line $y=ay_{max}$.

The upper part $0 \leq y < ay_{max}$ is mapped to the half-sphere so that $$\theta(x, y) = \frac{y}{y_{max}} \frac{\pi}{2} \quad (1)$$

$$\varphi(x, y) = 2\pi \frac{x}{x_{max}}.$$

For each pixel in the upper part of the images we compute the angles and find the point where the ray from the coordinate center corresponding to these angles crosses the 3D model's surface. The coordinate R of this point (distance from the point to the sphere center) is used as intensity in the image $I_s$ for the pixel (x,y), while RGB values of texture in this point (calculated using a UV mapping given for the 3D model) are set in the image $I_t$ for the pixel (x,y).

The lower part $ay_{max} \leq y < y_{max}$, is mapped to the cylinder:

$$z(x, y) = \frac{y_{max} - y}{y_{max}(1-\alpha)} H \qquad (2)$$

$$\varphi(x, y) = 2\pi \frac{x}{x_{max}},$$

where H is the cylinder height. For each pixel in the lower part of the images we compute the angles and find the point where the ray from the coordinate center corresponding to these angles crosses the 3D model's surface. The coordinate $I_s$ of this point (distance from the point to the cylinder axis) is used as intensity in the image $I_s$ for the pixel (x,y), while RGB values of texture in this point (calculated using a UV mapping given for the 3D model) are set in the image $I_t$ for the pixel (x,y).

Now let us define an inverse mapping, from $I_s$ and $I_t$, the 3D model. For each pixel with coordinates (x,y) we plot a ray defined by (1)-(2) above, and define a 3D point $\vec{p}(x,y)$, on this ray using the value I(x,y) of the pixel in $I_s$: for $0 \leq y < ay_{max}$ we treat this value as the distance from the center of the sphere, and for $ay_{max} \leq y < y_{max}$ it is the distance from the cylinder axis. Now, once we have all 3D points, we build a set of polygons in the following way: for each pixel (x,y), where $x < x_{max}-1$ and $y < y_{max}-1$ we define a triangle with vertices $\vec{p}(x,y)$, $\vec{p}(x+1,y)$, $\vec{p}(x+1,y+1)$, and another triangle with vertices $\vec{p}(x,y)$, $\vec{p}(x,y+1)$, $\vec{p}(x+1,y+1)$. We also define the image $I_t$ as the 3D model texture, and the UV map such that the texture pixel (x,y) is mapped to the vertex $\vec{p}(x,y)$.

Mappings from a 3D model to images $I_s$, $I_t$ and back define a 3D model representation with two images. Given this representation, we can apply neural networks to the problem of generating 3D models from images.

2. Neural Network Architecture.

While the representation of a 3D model with images $I_s$ and $I_t$ described above ensures alignment between these images, the input image with a person's selfie is not aligned with either $I_s$ and $I_t$ (see FIG. 4—for example, ear centers have the same coordinates in $I_s$ and $I_t$, but different coordinates in the selfie image). This means that a feature in a 3D model such as an eye center or a mouth corner will be represented by pixels with the same coordinates in the images $I_s$ and $I_t$, but its coordinates in the input selfie won't be the same. This has to be taken into account when designing a neural network, and this is the next key element in the proposed system. Conventional convolutional neural networks are not suited for this type of task due to a slowly growing receptive field. We utilize deformable convolutions [10] or atorus convolutions (aka dilated convolutions) [9] that resolve this issue. See Table 1 for an example of how to implement it. Such a network can be trained with any standard neural network training, for example, we have used Adam [11] with learning rate 1 e-4, decreased down to 1 e-5 after convergence, and beta1 is 0.9, beta2 is 0.999 and batch size is 1.

TABLE 1

Architecture of the neural network.
The table lists the layers of the neural network, one layer per row. The "Output Shape" column shows dimensions of an output from the corresponding layer in the format of Number of Channels × Height × Width. The "Previous Layer" shows the layers that are inputs to the corresponding layer. The layer types indicated in the first column have the following meaning: "data" is input to the network; "convolution" is either deformable or atorus convolution and it is immediately followed by a non-linearity such as ReLU [13]; "upsampling" is 2× resize upwards, "concat" is concatenation of inputs by channels, "tanh" is hyperbolic tangent. A layer type in the first column is followed by an index to indicate the number of a specific layer of this type in the network.

| Layer (type) | Output Shape | Previous Layer |
| --- | --- | --- |
| data | 3 × 256 × 256 | |
| convolution0 | 12 × 256 × 256 | data |
| convolution1 | 32 × 128 × 128 | convolution0 |
| convolution2 | 64 × 64 × 64 | convolution1 |
| convolution3 | 128 × 32 × 32 | convolution2 |
| convolution4 | 256 × 16 × 16 | convolution3 |
| convolution5 | 512 × 8 × 8 | convolution4 |
| convolution6 | 512 × 4 × 4 | convolution5 |
| convolution7 | 512 × 4 × 4 | convolution6 |
| upsampling0 | 512 × 8 × 8 | convolution7 |
| concat0 | 1024 × 8 × 8 | upsampling0 convolution5 |
| convolution8 | 512 × 8 × 8 | concat0 |
| upsampling1 | 512 × 16 × 16 | convolution8 |
| concat1 | 768 × 16 × 16 | upsampling1 convolution4 |
| convolution9 | 512 × 16 × 16 | concat1 |
| upsampling2 | 512 × 32 × 32 | convolution9 |
| concat2 | 640 × 32 × 32 | upsampling2 convolution3 |
| convolution10 | 512 × 32 × 32 | concat2 |
| upsampling3 | 512 × 64 × 64 | convolution10 |
| concat3 | 576 × 64 × 64 | upsampling3 convolution2 |
| convolution11 | 512 × 64 × 64 | concat3 |
| upsampling4 | 512 × 128 × 128 | convolution11 |
| concat4 | 544 × 128 × 128 | upsampling4 convolution1 |
| convolution12 | 512 × 128 × 128 | concat4 |
| upsampling5 | 512 × 256 × 256 | convolution12 |
| concat5 | 524 × 256 × 256 | upsampling5 convolution0 |
| convolution13 | 256 × 256 × 256 | concat5 |
| convolution14 | 4 × 256 × 256 | convolution13 |
| tanh0 | 4 × 256 × 256 | convolution14 |

3. Neural Network Training

The neural network is trained on a set of 3D models. These models have to be aligned with each other, so that facial features for different models are close to each other in the corresponding images $I_s$ and $I_t$. In order to accomplish this, first, we rotate all the models to the "standard orientation", as described in the section 1. Then, we render a frontal image of each 3D model, detect facial features in this image (using [12] or other methods for facial feature detection) and apply a 3D affine transformation to each model in order to make the coordinates of these features as close to the average position for each feature as possible. Then each 3D model is mapped to a pair of images $I_s$ and $I_t$ as described in the section 1. We also generate a set of frontal images for each 3D model by varying lighting and pose. This set of 3D model images $I_s$ and $I_t$ and frontal images is used to train the neural network. See FIG. 2 for the outline of the training procedure.

4. Generation of a 3D Model at Run-Time.

Finally, once the network is trained, we use it to generate $I_s$ and $I_t$ from an input image. Then we reconstruct a 3D model from $I_s$ and $I_t$ as described in the section 1. It can be optionally post-processed (e.g. smoothed, sharped, simplified, re-meshed or any other mesh filtering) to get the final 3D model, which can be manufactured by 3D printing, visualized or otherwise incorporated into any media. See FIG. 3 for the overview of the inference procedure.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCES

[1] Blanz, V., & Vetter, T. (1999, July). A morphable model for the synthesis of 3D faces. In Proceedings of the 26th annual conference on Computer graphics and interactive techniques (pp. 187-194). ACM Press/Addison-Wesley Publishing Co.

[2] Tran, L., & Liu, X. (2018). Nonlinear 3D Face Morphable Model. arXiv preprint arXiv:1804.03786.

[3] Tran, A. T., Hassner, T., Masi, I., & Medioni, G. (2017, July). Regressing robust and discriminative 3D morphable models with a very deep neural network. In Computer Vision and Pattern Recognition (CVPR), 2017 IEEE Conference on (pp. 1493-1502). IEEE.

[4] Richardson, E., Sela, M., Or-El, R., & Kimmel, R. (2017, July). Learning detailed face reconstruction from a single image. In Computer Vision and Pattern Recognition (CVPR), 2017 IEEE Conference on (pp. 5553-5562). IEEE.

[5] Sheffer, A., Praun, E., & Rose, K. (2007). Mesh parameterization methods and their applications. Foundations and Trends® in Computer Graphics and Vision, 2(2), 105-171.

[6] Jackson, A. S., Bulat, A., Argyriou, V., & Tzimiropoulos, G. (2017, October). Large pose 3D face reconstruction from a single image via direct volumetric CNN regression. In 2017 IEEE International Conference on Computer Vision (ICCV)(pp. 1031-1039). IEEE.

[7] Feng, Y., Wu, F., Shao, X., Wang, Y., & Zhou, X. (2018). Joint 3D Face Reconstruction and Dense Alignment with Position Map Regression Network. arXiv preprint arXiv:1803.07835.

[8] Isola, P., Zhu, J. Y., Zhou, T., & Efros, A. A. (2017). Image-to-image translation with conditional adversarial networks. arXiv preprint.

[9] Yu, F., & Koltun, V. (2015). Multi-scale context aggregation by dilated convolutions. arXiv preprint arXiv:1511.07122.

[10] Dai, J., Qi, H., Xiong, Y., Li, Y., Zhang, G., Hu, H., & Wei, Y. (2017). Deformable convolutional networks. CoRR, abs/1703.06211, 1(2), 3.

[11] Kingma, D. P., & Ba, J. (2014). Adam: A method for stochastic optimization. arXiv preprint arXiv:1412.6980.

[12] Kazemi, V., & Sullivan, J. (2014). One millisecond face alignment with an ensemble of regression trees. In Proceedings of the IEEE Conference on Computer Vision and Pattern Recognition (pp. 1867-1874).

[13] Krizhevsky, A., Sutskever, I., & Hinton, G. E. (2012). Imagenet classification with deep convolutional neural networks. In Advances in neural information processing systems (pp. 1097-1105).

[14] Fan, H., Su, H., & Guibas, L. J. (2017). A point set generation network for 3d object reconstruction from a single image. In Proceedings of the IEEE conference on computer vision and pattern recognition (pp. 605-613).

[15] Kurenkov, A., Ji, J., Garg, A., Mehta, V., Gwak, J., Choy, C., & Savarese, S. (2018, March). Deformnet: Free-form deformation network for 3d shape reconstruction from a single image. In 2018 IEEE Winter Conference on Applications of Computer Vision (WACV) (pp. 858-866). IEEE.

The invention claimed is:

1. A method of neural network learning of 3D models of human heads comprising the steps of:
   a) providing at least two training 3D models produced by scanning or modeling representative human heads;
   b) mapping each training 3D model to a pair of target images comprising an $I_s$ image that describes the model shape, and an $I_t$ image that describes the model texture; and
   c) rendering a frontal image of each training 3D model, detecting facial features in the frontal images, and applying a 2D affine transformation to the frontal images in order to make the coordinates of the facial features as close to the average position of facial features for all the training 3D models to produce frontal images of the representative heads,
   wherein step b) comprises:
   i) placing each of the training 3D model of a human head in the standard orientation into a reference surface, wherein the reference surface consists of a cylinder and a half-sphere, the cylinder axis coinciding with the z axis, the cylinder upper plane being placed on the level of a forehead of training 3D model, and the half-sphere placed on top of the cylinder upper plane; and the standard orientation is the training 3D model orientation with a line between the eyes parallel to x axis, the line of sight parallel to y axis, and z axis going from the (approximately) center of the neck up to the top of the head;
   ii) for points with z coordinate smaller than or equal to the upper cylinder plane, producing a cylindrical projection to establish the correspondence between the human head and the reference surface;
   iii) for points with z coordinate larger than the cylinder upper plane, producing a spherical projection to establish the correspondence between the human head and the reference surface; and
   iv) defining a distance r for each point from the human head as a distance from a point from the human head to the cylinder axis for points lower than or equal to the cylinder upper plane, and as a distance from a point from the human head to the half-sphere center for points above the cylinder upper plane.

2. The method of claim 1 wherein step b) further comprises:
   v) mapping the lower part of the images $I_s$ and $I_t$ to the cylinder, with x coordinates of image pixels linearly mapped to the azimuthal angle of the cylinder points, and y coordinates of image pixels linearly mapped to the z coordinate of the cylinder points;

vi) mapping the upper part of the images $I_s$ and $I_t$ to the half-sphere, with x coordinate of image pixels linearly mapped to the azimuthal angle of the half-sphere points, and y coordinate of image pixels linearly mapped to the polar angle of the half-sphere points.

3. A method of producing a 3D model from a 2D image of an individual human head comprising the steps of:

d) providing a 2D input image containing an individual human head in a frontal position; detecting facial features in the 2D input image, and applying a 2D affine transformation to the image in order to make the coordinates of the facial features as close to the average position of facial features for all training 3D models stored in a neural network to produce a final 2D input image;

e) using the neural network to generate a pair of target images $I_s$ and $I_t$ of the individual human head from the 2D input image; and f) reconstructing a 3D model of the individual human head from the pair of target images $I_s$ and $I_t$ generated by the neural network, wherein step f) of reconstructing a 3D model of a human head from a pair of target images $I_s$ and $I_t$ comprises:

mapping the pair of target images $I_s$ and $I_t$ onto a reference surface, wherein the reference surface consists of a cylinder and a half-sphere, to produce a plurality of reference surface points; and reconstructing the 3D model of a human head from the plurality of reference surface points.

4. The method of claim 3 where the reconstructed 3D model of the individual human head is further processed by the step of smoothing, sharpening, simplifying or re-meshing.

* * * * *